United States Patent
Garrett et al.

(10) Patent No.: US 10,544,840 B2
(45) Date of Patent: Jan. 28, 2020

(54) SYSTEM AND METHOD FOR REDUCING CLUTCH FILL TIME

(71) Applicant: Caterpillar Inc., Peoria, IL (US)

(72) Inventors: Konrad Garrett, Pekin, IL (US); Heath Toennies, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 225 days.

(21) Appl. No.: 15/837,079

(22) Filed: Dec. 11, 2017

(65) Prior Publication Data
US 2019/0178307 A1    Jun. 13, 2019

(51) Int. Cl.
*F16D 25/12* (2006.01)
*F16D 13/38* (2006.01)
*F16D 13/52* (2006.01)

(52) U.S. Cl.
CPC ............ *F16D 25/12* (2013.01); *F16D 13/385* (2013.01); *F16D 13/52* (2013.01)

(58) Field of Classification Search
CPC .......... F16D 25/00–25/14; F16D 13/52; F16D 13/385; F16D 48/02; F16D 2048/0212; F16D 48/0206; F16D 2048/0224; F16D 2500/1045; F16D 2048/0203; F16D 2048/0287; F16D 2121/02; F16H 2061/004
See application file for complete search history.

(56) References Cited

U.S. PATENT DOCUMENTS

| | | | |
|---|---|---|---|
| 3,688,601 A * | 9/1972 | Dach | F16H 61/0262 475/146 |
| 5,325,670 A | 7/1994 | Lino | |
| 5,622,088 A | 4/1997 | Reid | |
| 7,669,701 B2 | 3/2010 | Ogata et al. | |
| 8,037,988 B2 | 10/2011 | Long et al. | |
| 8,843,289 B2 | 9/2014 | Postic et al. | |
| 9,611,906 B2 * | 4/2017 | Asano | F16D 25/123 |
| 2011/0139564 A1 * | 6/2011 | Czoykowski | F16D 21/06 192/48.601 |
| 2014/0110209 A1 * | 4/2014 | Goleski | F16D 48/0206 192/48.601 |
| 2015/0198234 A1 | 7/2015 | Patenaude et al. | |

FOREIGN PATENT DOCUMENTS

| | | |
|---|---|---|
| DE | 10039836 | 2/2002 |
| FR | 3035478 | 10/2016 |
| JP | H02129413 | 5/1990 |
| JP | 2015081653 | 4/2015 |

* cited by examiner

*Primary Examiner* — Jacob S. Scott
*Assistant Examiner* — Lillian T Nguyen

(57) ABSTRACT

A hydraulic clutch assembly includes a rotating shaft. A first clutch and a second clutch are coupled to the shaft. A first passageway located within the shaft supplies an actuating fluid to the first clutch. A second passageway located within the shaft supplies the actuating fluid to the second clutch. A first bleed passage is fluidly coupled with the first passageway. A second bleed passage is fluidly coupled to the second passageway and the first bleed passage. A first outlet is fluidly coupled to the first bleed passage. A second outlet is fluidly coupled to the second bleed passage. The first outlet and the second outlet merge together to form an outlet passage.

20 Claims, 4 Drawing Sheets

SYSTEM AND METHOD FOR REDUCING CLUTCH FILL TIME

TECHNICAL FIELD

The present disclosure relates to clutch actuation for a transmission. More specifically, the present disclosure relates to removing air from non-pressurized clutch actuation passages.

BACKGROUND

A transmission is designed to transfer power from a prime mover to a machine for conducting work, such as, digging, trenching, excavating etc. The transmission may include one or more hydraulically actuated clutch assemblies. The clutches are positioned on a shaft that may include multiple passageways located within the clutch shaft. The passageways supply an actuating fluid to the clutches for engaging and disengaging the clutches. The clutches are actuated as per a gear selection made by a user or an electronic control module (ECM).

As the passageways are filled with the actuating fluid in a sequential or simultaneous manner, the actuating fluid drains from the passageways which are in the off state or are not pressurized. When the fluid drains from the passages air may become trapped inside clutch piston cavities or within the passageways in the shafts, or air pockets may be formed. Effectiveness of clutch fill time and gear shift quality can occur due to the entrapped air.

U.S. Patent Publication 2015/0198234 issued to Patenaude et al. and assigned to Caterpillar Inc. discloses an apparatus and method for alleviating air entrapped in a shaft of a power take off (PTO). In the disclosed reference a seal carrier has a number of cross ports that are connected to center passages. As the seal carrier rotates during operation, the seal carrier acts as a centrifuge and entrapped air in the hydraulic fluid is separated from the hydraulic fluid. The released air moves into the center passage and out through one of the connecting passages, ultimately to a tank or reservoir. While providing an effective arrangement to alleviate trapped air, there may be additional solutions. The present disclosure is directed to addressing one or more of the shortcomings as set forth above.

SUMMARY

In an aspect of the present disclosure, a hydraulic clutch assembly is provided. The hydraulic clutch assembly includes a rotating shaft, a first clutch coupled to the shaft, and a second clutch coupled to the shaft. The hydraulic clutch assembly includes a first passageway located within the shaft. The first passageway is configured to supply an actuating fluid to the first clutch. The hydraulic clutch assembly includes a second passageway located within the shaft. The second passageway is configured to supply the actuating fluid to the second clutch. The hydraulic clutch assembly includes a first bleed passage fluidly coupled with the first passageway. The hydraulic clutch assembly includes a second bleed passage fluidly coupled to the second passageway and the first bleed passage. The hydraulic clutch assembly includes a first outlet fluidly coupled to the first bleed passage, and a second outlet fluidly coupled to the second bleed passage. The first outlet and the second outlet merge together to form an outlet passage.

In another aspect of the present disclosure, a method of operating a hydraulic clutch assembly is disclosed. The hydraulic clutch assembly includes a rotating shaft, a first clutch coupled to the shaft, and a second clutch coupled to the shaft. The method includes supplying a pressurized actuating fluid to a first passageway and subsequently to a first outlet fluidly coupled to a first bleed passage. The first passageway supplies the pressurized actuating fluid to the first clutch. The method includes creating a low-pressure zone in a second outlet fluidly coupled to a second bleed passage, wherein the second outlet is fluidly coupled to the first outlet and a second passageway. The method further includes scavenging a one of oil or air trapped within the second passageway.

In yet another aspect of the present disclosure, a transmission is disclosed. The transmission includes an input member configured to receive drive input from a power source. A hydraulic clutch assembly is coupled to the input member. The hydraulic clutch assembly includes a rotating shaft, a first clutch coupled to the shaft, and a second clutch coupled to the shaft. A first passageway is located within the shaft for supplying an actuating fluid to the first clutch. A second passageway is located within the shaft for supplying the actuating fluid to the second clutch. A first bleed passage is fluidly coupled with the first passageway. A second bleed passage is fluidly coupled to the second passageway and the first bleed passage. A first outlet is fluidly coupled to the first bleed passage. A second outlet is fluidly coupled to the second bleed passage. The first outlet and the second outlet merge together to form an outlet passage.

DETAILED DESCRIPTION

Figure 1:
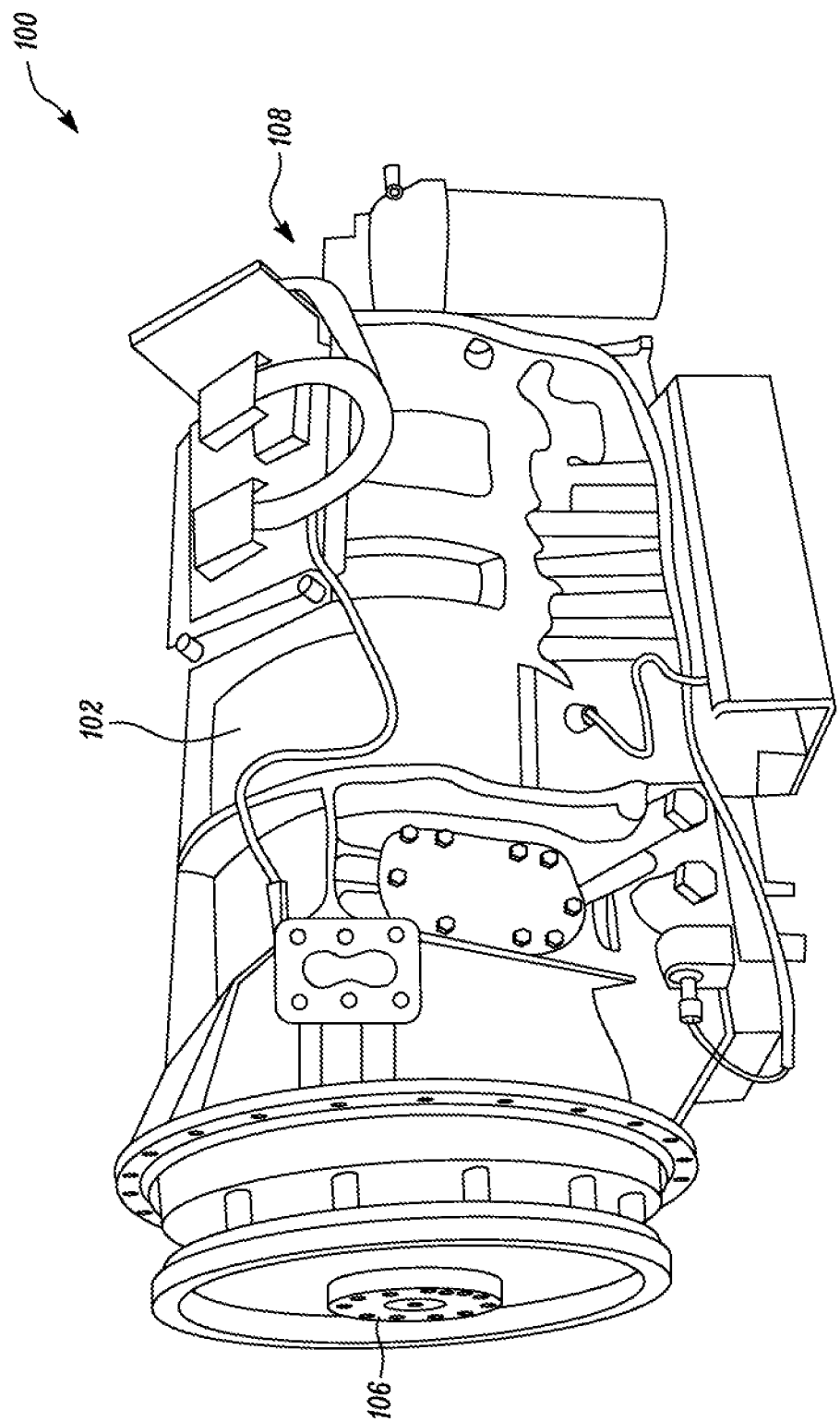
FIG. 1 illustrates an exterior view of a transmission, in accordance with the present disclosure.

Wherever possible, the same reference numbers will be used throughout the drawings to refer to same or like parts. FIG. 1 shows an exemplary transmission 100. The transmission 100 is illustrated as a hydraulically actuated transmission which may be used, for example, in construction, on-highway, off-road, oil and gas, mining machines, power generation etc. While the following detailed description describes an exemplary aspect in connection with the hydraulically actuated transmission, it should be appreciated that the description applies equally to the use of the present disclosure in other applications as well.

The transmission 100 includes an outer body 102. The transmission 100 includes an input member 106 configured to receive drive input from a power source (not shown). The transmission 100 may be coupled via an output end 108 to transfer power to an output member such as a drive shaft, differential or the like (not shown). The transmission 100 may also include various other components which are not discussed here, as the present disclosure is not limited by any such components in any manner.

Figure 2:
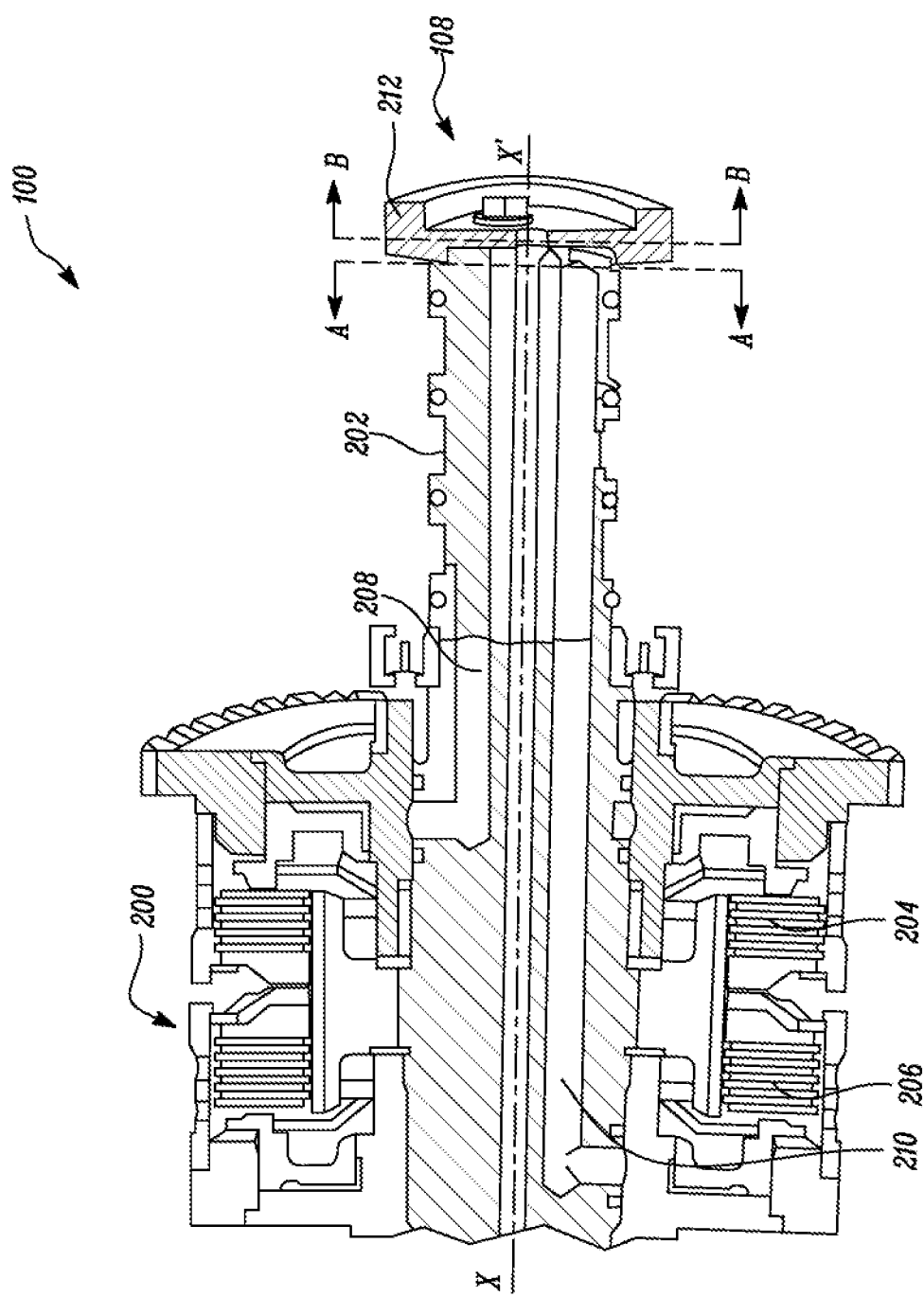
FIG. 2 illustrates a centerline sectional view of the transmission, in accordance with the present disclosure.

Referring now to FIG. 2, which is a sectional portion of the transmission 100. The transmission 100 includes a hydraulic clutch assembly 200 housed within the outer body 102. The hydraulic clutch assembly 200 is configured to receive power from the input member 106 and transfer power to the output end 108 as per application requirements. An idler gear 212 is attached to the transmission 100 towards the output end 108. The hydraulic clutch assembly 200 includes a shaft 202 having a rotational axis XX'. The hydraulic clutch assembly 200 includes a first clutch 204 and a second clutch 206 coupled to the shaft 202. While only the first and second clutches 204, 206 are shown, additional or fewer numbers of clutches may be included for different transmission arrangements.

The hydraulic clutch assembly 200 further includes a first passageway 208 provided within the shaft 202. The first passageway 208 is drilled inside the shaft 202 as a blind passage towards the output end 108 of the shaft 202. The first passageway 208 supplies an actuating fluid to the first clutch 204 to engage or disengage the first clutch 204. Similarly, the hydraulic clutch assembly 200 includes a second passageway 210 provided within the shaft 202. The second passageway 210 is drilled inside the shaft 202 as a blind passage towards the output end 108 of the shaft 202. The second passageway 210 supplies the actuating fluid to the second clutch 206 to engage or disengage the second clutch 206.

Figure 3B:
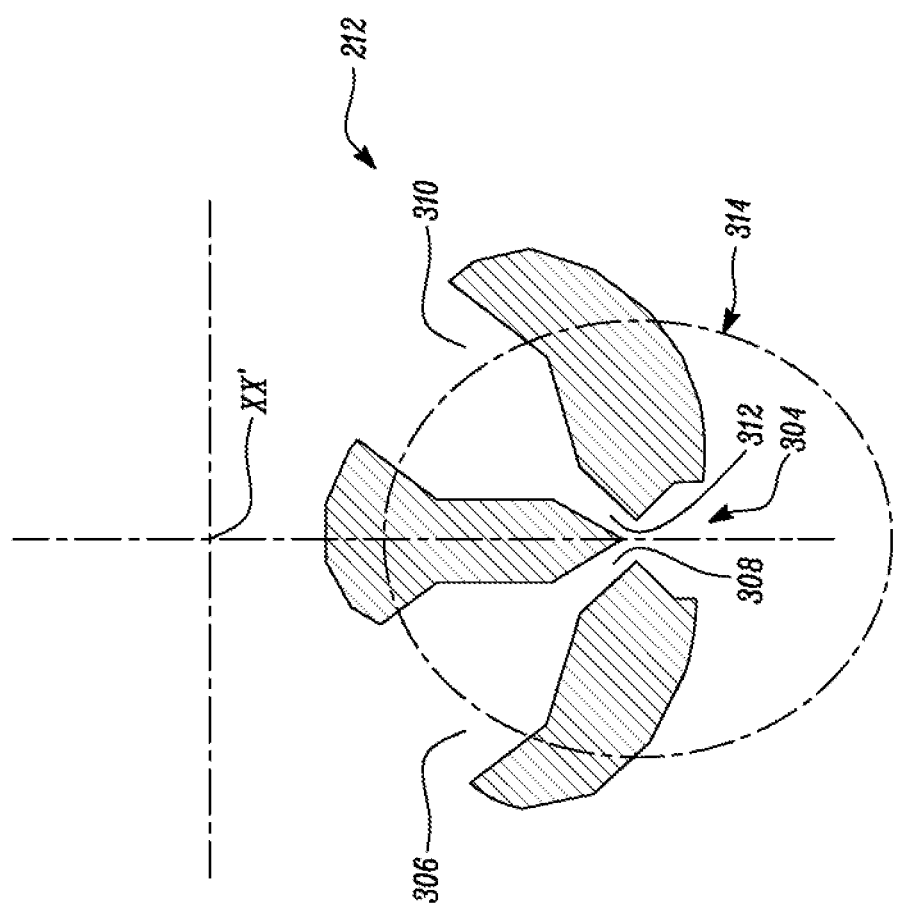
FIG. 3B illustrates a partial sectional view of the shaft taken along section B-B of FIG. 2, in accordance with the present disclosure.
Figure 3A:
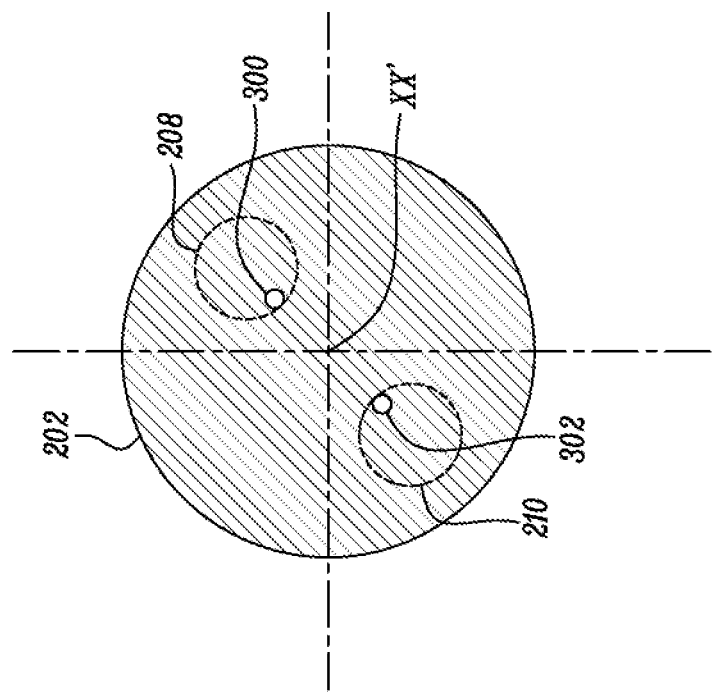
FIG. 3A illustrates a partial sectional view of the shaft taken along section A-A of FIG. 2, in accordance with the present disclosure.

FIG. 3A shows a partial sectional view of the shaft 202, taken along section line A-A. The shaft 202 includes the first passageway 208 and the second passageway 210. In the exemplary view shown, the first passageway 208 and the second passageway 210 are located symmetrically about the rotational axis X-X' of the shaft 202. The shaft 202 further includes a first bleed passage 300 and a second bleed passage 302. The first bleed passage 300 is in fluid communication with the first passageway 208. The first bleed passage 300 is positioned at the output end 108 of the shaft 202 and has a diameter smaller than a diameter of the first passageway 208. The first bleed passage 300 is positioned so that a point on the diameter of the first bleed passage 300 touches a point on the diameter of the first passageway 208 closest to the axis of rotation X-X'.

The second bleed passage 302 is in fluid communication with the second passageway 210, and also is in fluid communication with the first bleed passage 300. The second bleed passage 302 is positioned at the output end 108 of the shaft 202 and has a diameter smaller than a diameter of the second passageway 210. The second bleed passage 302 is positioned so that a point on the diameter of the second bleed passage 302 touches a point on the diameter of the second passageway 210 closest to the axis of rotation X-X'.

FIG. 3B shows a partial sectional view of the idler gear 212, taken along section line B-B. The first bleed passage 300 and the second bleed passage 302 are shown as being positioned inside the shaft 202, however it should be understood that the first bleed passage 300 and the second bleed passage 302 may also be positioned in other mating components. Although, the first bleed passage 300 is shown as being parallel to the second bleed passage 302 and the axis of rotation X-X', the first and second bleed passages 300, 302 may be provided at an angular orientation to each other as well. The first bleed passage 300 is in fluid communication with a first inlet 306 and a first outlet 308. The second bleed passage 302 is in fluid communication with a second inlet 310 and a second outlet 312. The first outlet 308 and the second outlet 312 intersect one another at an angular orientation. The first outlet 308 and the second outlet 312 are fluidly connected to each other at an outlet passage 304. The first outlet 308 and the second outlet 312 merge together to form the outlet passage 304. The intersection of the first outlet 308, the second outlet 312, and the outlet passage 304 together forms a venturi 314. It should be understood that FIG. 2 is not showing the first bleed passage 300 and the second bleed passage 302 for the sake of clarity in the sectional view.

Figure 4:
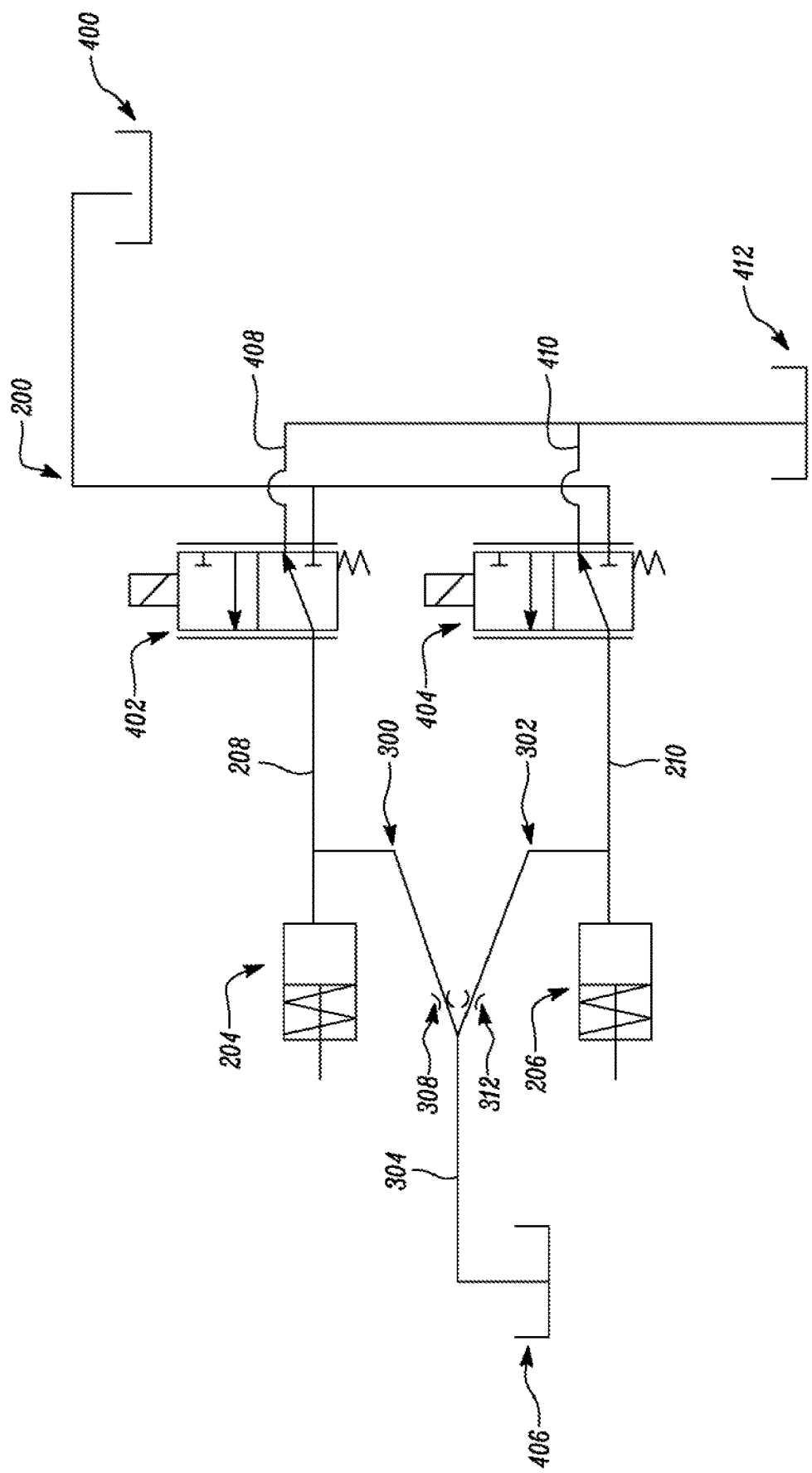
FIG. 4 schematically illustrates a fluid circuit for the transmission system, in accordance with the present disclosure.

FIG. 4 shows a schematic hydraulic circuit for the hydraulic clutch assembly 200. The hydraulic clutch assembly 200 includes the first clutch 204 and the second clutch 206. The actuation fluid is supplied to the first clutch 204 and the second clutch 206 through a first reservoir 400. The first reservoir 400 may be a source of the actuation fluid which may supply adequate amount of the actuation fluid to the first clutch 204 and the second clutch 206 at high-pressure for actuating the first clutch 204 and the second clutch 206 respectively. A pump (not shown) is coupled with the first reservoir 400 for pressurizing the actuation fluid to a predetermined operating pressure.

A first valve 402 controls supply of the actuation fluid from the first reservoir 400 to the first clutch 204, and a second valve 404 controls supply of the actuation fluid from the first reservoir 400 to the second clutch 206. The first valve 402 and the second valve 404 are illustrated as solenoid actuated valves. However, the first valve 402 and the second valve 404 may be any other type of valves as well which may be suitable for application with various aspects of the present disclosure. The first valve 402 and the second valve 404 may further be operably coupled to a controller (not shown) which may control the actuation of the first valve 402 and the second valve 404 according to the need of the application for which the transmission 100 is being used.

The pressurized actuation fluid is supplied from the first valve 402 to the first clutch 204 by the first passageway 208. Similarly, the pressurized actuation fluid is supplied from the second valve 404 to the second clutch 206 by the second passageway 210. The first bleed passage 300 is in fluid communication with the first passageway 208, and the second bleed passage 302 is in fluid communication with the second passageway 210. The first outlet 308 and the second outlet 312 merge together to form the outlet passage 304. The first outlet 308, the second outlet 312, and the outlet passage 304 together form the venturi 314. The outlet passage 304 is further coupled to a second reservoir 406. The second reservoir 406 may be a low-pressure reservoir which may store the actuation fluid to recirculate back to the first reservoir 400.

The hydraulic clutch assembly 200 further includes a first return passage 408 and a second return passage 410 for the first clutch 204 and the second clutch 206 respectively for returning the actuation fluid to a third reservoir 412. The first return passage 408 is coupled to the first passageway 208 through the first valve 402, and the second return passage 410 is coupled to the second passageway 210 through the second valve 404. The first valve 402 and the second valve 404 may be actuated accordingly to return the actuation fluid to the third reservoir 412 when the first clutch 204 and the second clutch 206 respectively are disengaged.

INDUSTRIAL APPLICABILITY

The present disclosure provides a method to operate the hydraulic clutch assembly 200. With combined reference to FIGS. 3A, 3B and 4, the actuating fluid is passed through the first passageway 208 and the second passageway 210 in a sequentially alternating manner to actuate the first clutch 204 and the second clutch 206 alternatively. When the first clutch 204 is actuated, fluid in the first passageway 208 is pressurized entering the first clutch 204 and exiting the first bleed passage 300 and enters the first inlet 306. The pressurized fluid then moves through the first outlet 308 into the outlet passage 304. When the pressurized actuation fluid exits through the first outlet 308, the pressurized actuation fluid creates a low-pressure zone in the second outlet 312 of the second passageway 210. When the pressurized actuation fluid passes through the first outlet 308, and then through the outlet passage 304, the second outlet 312 of the second bleed passage 302 acts as the venturi 314 and creates the low-pressure zone. The low-pressure zone draws or scavenges fluid/air from the second passageway 210 to aid in removing any air that may be trapped inside the second passageway 210.

Similarly, when the second clutch 206 is actuated, fluid in second passageway 210 is pressurized entering the second clutch 206 and exiting the second bleed passage 302 and enters the second inlet 310. The pressurized fluid then moves through the second outlet 312 into the outlet passage 304. When the pressurized actuation fluid exits through the second outlet 312, the pressurized actuation fluid creates a low-pressure zone in the first outlet 308 of the first passageway 208. When the pressurized actuation fluid passes through the second outlet 312, and then through the outlet passage 304, the second outlet 312 of the first bleed passage 300 acts as the venturi 314 and creates the low-pressure zone. The low-pressure zone draws or scavenges fluid/air from the first passageway 208 to aid in removing any air that may be trapped inside the first passageway 208.

The release of trapped air from the first passageway 208 and the second passageway 210 reduces time required to fill the first passageway 208 and the second passageway 210. This allows in achieving a better response time over extended periods of time when one of the clutches may not be in use for some time. Further, the release of trapped air reduces pressure inside the first passageway 208 and the second passageway 210. The method may further include circulating oil through the disengaged clutch to maintain consistent temperature inside the disengaged clutch. Pressure reduction inside the first passageway 208 and the second passageway 210 while the respective clutch is disengaged reduces amount of positive pressure required to keep the shaft 202 full of oil against rotating pressure head of the shaft 202. This may more efficiently protect the first clutch 204 and the second clutch 206 against auto-engagement. Also, as the residual actuation fluid is efficiently scavenged, circulation of warm actuation fluid through disengaged clutch reduces variation in clutch fill times due to variation in viscosity of warm actuation fluid and cold actuation fluid.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A hydraulic clutch assembly comprising:
    a rotating shaft;
    a first clutch coupled to the shaft;
    a second clutch coupled to the shaft;
    a first passageway disposed within the shaft, and configured to supply an actuating fluid to the first clutch;
    a second passageway disposed within the shaft, and configured to supply the actuating fluid to the second clutch;
    a first bleed passage fluidly coupled with the first passageway;
    a second bleed passage fluidly coupled to the second passageway and the first bleed passage;
    a first outlet is fluidly coupled to the first bleed passage;
    a second outlet is fluidly coupled to the second bleed passage; and
    wherein the first outlet and the second outlet merge together to form an outlet passage.

2. The hydraulic clutch assembly of claim 1 wherein when the first passageway is supplied with pressurized actuating fluid, passage of the pressurized actuating fluid through the first outlet creates a low-pressure zone in the second outlet, and subsequently scavenges a one of oil and air trapped within the second passageway.

3. The hydraulic clutch assembly of claim 1, wherein the first outlet and the second outlet are disposed within the shaft.

4. The hydraulic clutch assembly of claim 1, wherein when the second passageway is supplied with the pressurized actuating fluid, passage of the pressurized actuating fluid through the second outlet creates a low-pressure zone in the first outlet, and subsequently scavenges a one of oil and air trapped within the first passageway.

5. The hydraulic clutch assembly of claim 1, wherein the first outlet, and the second outlet are provided at an angular orientation.

6. The hydraulic clutch assembly of claim 5, wherein the first outlet, the second outlet, and the outlet passage together form a venturi.

7. The hydraulic clutch assembly of claim 1, wherein the first bleed passage has a diameter smaller than a diameter of the first passageway, and the second bleed passage has a diameter smaller than the diameter of the second passageway.

8. The hydraulic clutch assembly of claim 1, wherein the actuating fluid is passed through the first passageway and the second passageway in a sequentially alternating manner.

9. A method to operate a hydraulic clutch assembly, the hydraulic clutch assembly including a rotating shaft, the shaft having a first clutch and at least a second clutch coupled to the shaft, the method comprising:
    supplying an actuating fluid to a first passageway and subsequently to a first outlet fluidly coupled to a first bleed passage, wherein the first passageway is configured to supply the actuating fluid to the first clutch;
    creating a low-pressure zone in a second outlet fluidly coupled to a second bleed passage, wherein the second outlet is fluidly coupled to the first outlet and a second passageway; and
    scavenging a one of oil and air trapped within the second passageway.

10. The method of claim 9, wherein the method further includes:
    supplying an actuating fluid to the second passageway and subsequently to the second outlet, wherein the second passageway is configured to supply the actuating fluid to the second clutch;
    creating a low-pressure zone in the first outlet, wherein the first outlet is fluidly coupled to the second outlet and the first passageway; and scavenging a one of oil and air trapped within the first passageway.

11. The method of claim 9, wherein the second outlet is disposed within the shaft at an angular orientation to the first outlet.

12. The method of claim 9, wherein the first outlet, and the second outlet merge together to form an outlet passage.

13. The method of claim 12, wherein the first outlet, the second outlet, and the outlet passage together form a venturi.

14. The method of claim 9, wherein the actuating fluid is passed through the first passageway and the second passageway in a sequentially alternating manner.

15. A transmission comprising:
   an input member configured to receive drive input from a power source, and
   a hydraulic clutch assembly coupled to the input member, the hydraulic clutch assembly including:
      a rotating shaft coupled to the input member,
      a first clutch coupled to the shaft;
      a second clutch coupled to the shaft;
      a first passageway disposed within the shaft, and configured to supply an actuating fluid to the first clutch;
      a second passageway disposed within the shaft, and configured to supply the actuating fluid to the second clutch;
      a first bleed passage fluidly coupled with the first passageway;
      a second bleed passage fluidly coupled with the second passageway and the first bleed passage;
      a first outlet is fluidly coupled to the first bleed passage;
      a second outlet is fluidly coupled to the second bleed passage; and
      wherein the first outlet and the second outlet merge together to form an outlet passage.

16. The transmission of claim 15, wherein when the first passageway is supplied with pressurized actuating fluid, passage of the pressurized actuating fluid through the first outlet creates a low-pressure zone in the second outlet, and subsequently scavenges a one of oil and air trapped within the second passageway.

17. The transmission of claim 15, wherein when the second passageway is supplied with the actuating fluid, passage of the actuating fluid through the second outlet creates a low-pressure zone in the first outlet, and subsequently scavenges a one of oil and air trapped within the first passageway.

18. The transmission of claim 15, wherein the actuating fluid is passed through the first passageway and the second passageway in a sequentially alternating manner.

19. The transmission of claim 15, wherein the first outlet and the second outlet are provided at an angular orientation.

20. The transmission of claim 19, wherein the first outlet, the second outlet, and the outlet passage together form a venturi.

* * * * *